United States Patent [19]

Irwin

[11] Patent Number: 4,901,599

[45] Date of Patent: Feb. 20, 1990

[54] CROSS PIN RETAINER BLOCK FOR A BEVEL GEAR DIFFERENTIAL

[75] Inventor: Earl J. Irwin, Churubusco, Ind.

[73] Assignee: Dana Corporation, Toledo, Ohio

[21] Appl. No.: 291,506

[22] Filed: Dec. 29, 1988

[51] Int. Cl.[4] ............................................. F16H 1/40
[52] U.S. Cl. .................................................. 475/230
[58] Field of Search ................................. 74/710, 713

[56] References Cited

U.S. PATENT DOCUMENTS

| | | |
|---|---|---|
| 1,431,572 | 10/1922 | Dodge . |
| 1,508,832 | 9/1924 | Zimmerschied et al. ............. 74/713 |
| 2,529,392 | 11/1950 | Herreshoff ............................ 74/713 |
| 2,865,229 | 12/1958 | Hodanek ............................... 74/713 |
| 3,115,790 | 12/1963 | Cornish et al. ....................... 74/713 |
| 3,318,173 | 5/1967 | Pnidokas .............................. 74/713 |
| 3,328,844 | 6/1967 | Hedstrom ......................... 74/713 X |
| 3,673,889 | 7/1972 | Hauser ................................. 74/713 |
| 3,872,741 | 3/1975 | Berchtold et al. .................... 74/713 |
| 4,283,963 | 8/1981 | Hickey et al. .................... 74/713 X |
| 4,467,672 | 8/1984 | Lamy .................................... 74/713 |

Primary Examiner—Dirk Wright
Attorney, Agent, or Firm—MacMillan, Sobanski & Todd

[57] ABSTRACT

A retainer block and pinion cross shaft structure for a bevel gear differential eliminates the need for securing the cross shaft to the differential case by means of a conventional pressed roll pin. The retainer block is slotted and is adapted to be slipped over opposed flat surfaces formed on the central portion of the cross shaft to prevent axial and rotational movement of the cross shaft relative to the retainer block. The retainer block includes opposed end portions which extend axially outwardly into both side gear spline bores. The inner ends of the axle shafts are adapted to engage the opposed end surfaces of the retainer block to maintain the block and cross shaft in a fixed position relative to the differential case.

10 Claims, 1 Drawing Sheet

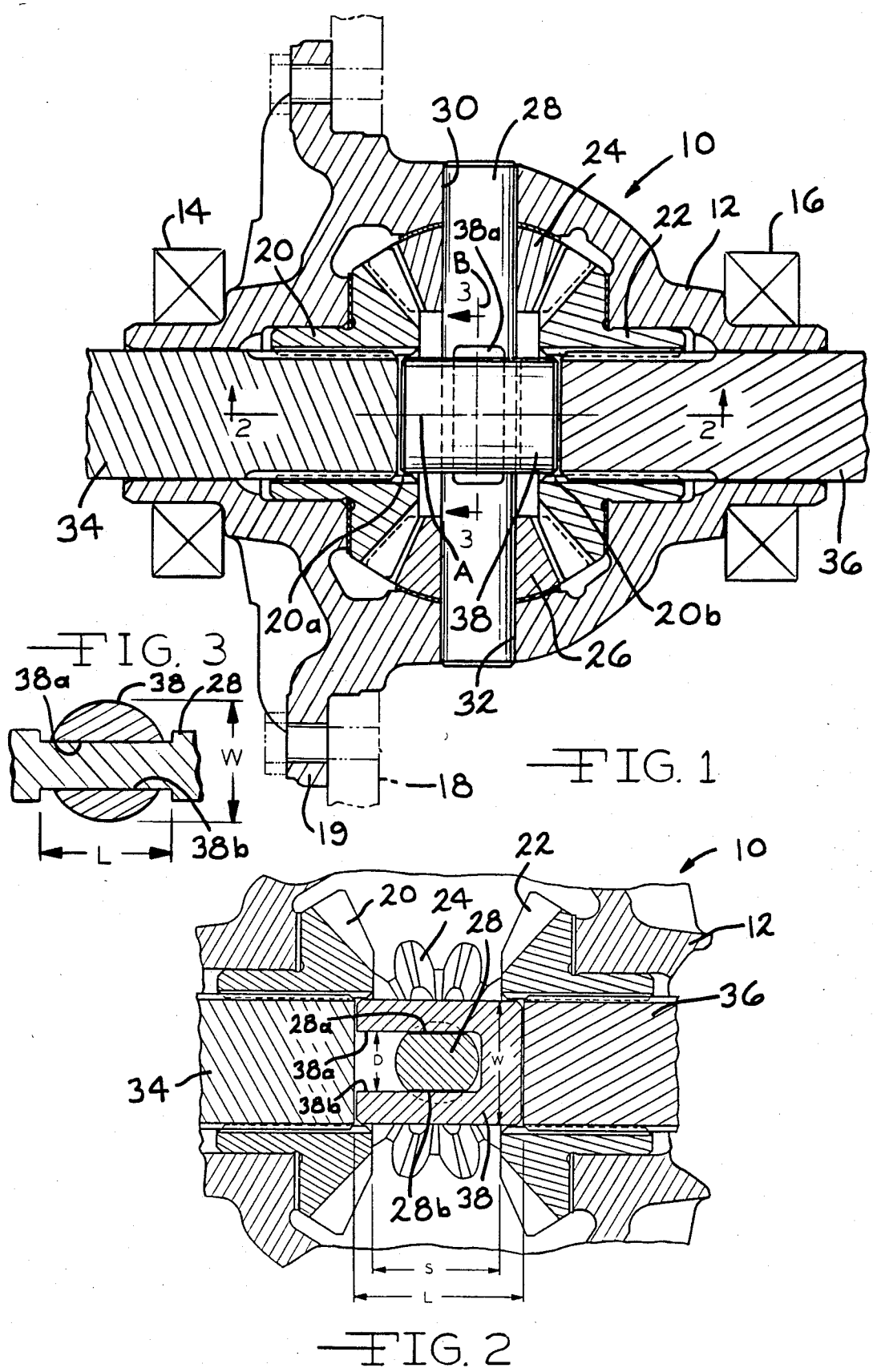

CROSS PIN RETAINER BLOCK FOR A BEVEL GEAR DIFFERENTIAL

BACKGROUND OF THE INVENTION

The present invention relates generally to a bevel gear differential assembly and, in particular, to a means for securing a pinion gear cross shaft relative to an associated differential case.

Bevel gear differential assemblies are well known and typically include a differential case which is rotatably supported within an associated housing. The differential case rotatably supports a pair of side gears which are meshed with at least two pinion gears. The pinion gears are generally rotatably supported about a cross shaft which extends perpendicularly and intersects the rotational axis of the side gears. This cross shaft is typically secured relative to the differential case by means of a roll pin which is pressed through aligned apertures formed in the differential case and the cross shaft.

Means other than a pressed roll pin have been proposed for securing the cross shaft relative to the differential case. For example, U.S. Pat. No. 4,467,672 discloses a differential wherein the pinion cross shaft has a central portion provided with an annular groove. The annular groove is adapted to receive a projection formed on the inner end of one of the axle shafts to retain the pinion cross shaft within the differential case. A similar mounting arrangement is disclosed in U.S. Pat. No. 3,673,889, wherein inner projecting portions of the axle shafts extend into a transverse bore centrally located in the pinion cross shaft.

SUMMARY OF THE INVENTION

The present invention relates to a unique retainer block structure for securing a pinion cross shaft within a bevel gear differential case. In particular, the retainer block structure is adapted for use in a bevel gear differential including a differential case having a pair of side gears rotatably supported within the case about a side gear axis. A pinion cross shaft is supported by the case and has a pinion axis generally perpendicular to and intersecting the side gear axis. A pair of pinion gears are rotatably supported within the case about the cross shaft, with each of the pinion gears meshingly engaging each of the side gears.

In accordance with the present invention, a retainer block is mounted on a central portion of the cross shaft in such a manner to limit and substantially prevent both rotational and axial movement of the pinion cross shaft relative to the retainer block. Further, the retainer block includes an end portion which is received within an opening formed in at least one of the side gears to limit and substantially prevent rotational and axial movement of the retainer block relative to the pinion axis. Thus, the pinion cross shaft is securely mounted within the differential case.

It has been found that a retainer block structure according to the present invention provides an effective means of retaining the pinion cross shaft while eliminating a portion of the machining steps previously required with the conventional pressed roll pin mounting structure.

The above, as well as other advantages of the present invention, will become readily apparent from a review of the following detailed description of the invention in conjunction with the attached drawings.

BRIEF DESCRIPTION OF THE DRAWINGS

FIG. 1 is a sectional view through a bevel gear differential illustrating the retainer block of the present invention centrally located on the pinion gear cross shaft;

FIG. 2 is a sectional view taken along the line 2-2 of FIG. 1; and

FIG. 3 is a sectional view taken along the line 3-3 of FIG. 1.

DESCRIPTION OF THE PREFERRED EMBODIMENT

Referring to FIGS. 1 and 2, there is shown a bevel gear differential, generally represented by the reference numeral 10. The differential includes a differential case 12 which is typically supported by a pair of spaced apart, tapered roller bearings 14 and 16 within an associated differential case housing (not shown). Typically, the differential case is rotated relative to the housing by means of a ring gear 18 (shown in phantom) which is secured to an annular peripheral portion 19 of the differential case 12.

A pair of spaced apart side gears 20 and 22 are rotatably supported within the differential case 12 about an axis A. A pair of pinion gears 24 and 26 are rotatably mounted about a pinion cross shaft 28 having an axis B which is perpendicular to and intersects the side gear axis A. The cross shaft 28 has end portions which are received within cylindrical apertures 30 and 32 formed in a differential case 12. The pinion gears 24 and 26 meshingly engage the side gears 20 and 22. The side gears 20 and 22 are provided with inner splined bores 20a and 20b which are adapted to receive spline inner ends of axle shafts 34 and 36, respectively.

In accordance with the present invention, the pinion cross shaft 28 is retained within the differential case 12 by means of a retainer block 38 which is slipped over a central portion of the shaft 28. As shown in FIG. 2, the central portion of the shaft 28 is provided with opposed flat surfaces 28a and 28b forming parallel spaced-apart surfaces separated by the distance D. As shown in FIG. 2, the cross-sectional configuration of the retain block 38 is generally U-shaped, and includes a pair of legs 38a and 38b having inner walls spaced apart by a distance slightly greater than the distance D, such that the retaining block can be slipped over the central portion of the shaft. As shown in FIG. 2, the retainer block has an overall length L which is greater than spacing S between the facing surfaces of the side gears 20 and 22. Also, the cross-sectional configuration of the block through a plane perpendicular to the axis A is generally circular, as shown in FIG. 3, and has a diameter W. The diameter W is slightly less than the inner diameter of the splined bores 20a and 20b of the side gears such that the retainer block extends axially into the splined bores of the side gears. Once the differential has been assembled and the axle shafts have been inserted into the respective side gears, the inner end of the axle shaft 36 will prevent the retainer block 38 from slipping off the shaft 28. Thus, the retainer block 38 will be held in a fixed position relative to differential case 12. This causes the pinion cross shaft 28 to be also held in a fixed position relative to the case 12 such that the cross shaft cannot rotate or move axially relative to the pinion axis B.

The present invention has been illustrated and described in what is considered to represent its preferred embodiment. However, it will be appreciated that the invention can be practiced otherwise than as specifically illustrated and described without departing from the spirit or scope of the attached claims.

What is claimed is:

1. A differential assembly comprising:
   a differential case;
   a pair of side gears rotatably supported within said case about a side gear axis;
   a pinion cross shaft supported by said case and having a pinion axis generally perpendicular to and intersecting said side gear axis;
   a pair of pinion gears rotatably supported within said case about said pinion cross shaft, each of said pinion gears meshingly engaging each of said side gears;
   a retainer block mounted on a central portion of said pinion cross shaft, said retainer block being mounted to said pinion cross shaft in such a manner to limit axial movement of said pinion cross shaft along said pinion axis relative to said retainer block;
   said retainer block including at least one end portion which is received within an opening formed in at least one of said side gears to secure said retainer block relative to said differential case.

2. The differential assembly according to claim 1 wherein said central portion of said pinion cross shaft is provided with a pair of opposed flat surfaces parallel to said pinion axis and spaced apart by a predetermined distance, and said retainer block is provided with a slot for receiving said central portion, said slot defining a pair of generally parallel surfaces in facing relation to one another and spaced apart by approximately said predetermined distance, thereby limiting rotational movement of said pinion cross shaft about said pinion axis relative to said retainer block.

3. The differential assembly according to claim 2 wherein at least one of said opposed flat surface extends axially along said pinion cross shaft a predetermined length, and wherein said slot in said retainer block extends approximately said predetermined length, thereby limiting the axial movement of said pinion cross shaft along said pinion axis relative to said retainer block.

4. The differential assembly according to claim 2 wherein said retainer block includes opposed end portions, one of said end portions extending into said side gear opening and the other of said end portions includes said slot.

5. The differential assembly according to claim 4 wherein an axle shaft is mounted within said side gear opening and includes an inner end surface engageable with said retainer block for preventing said retainer block from slipping off said central portion of said pinion cross shaft.

6. The differential assembly according to claim 1 wherein said retainer block is provided with opposed end portions which are received in openings formed in each of said side gears.

7. A differential assembly comprising:
   a differential case;
   a pair of side gears rotatably supported within said case about a side gear axis;
   a pinion cross shaft supported by said case and having a pinion axis generally perpendicular to and intersecting said side gear axis;
   a pair of pinion gears rotatably supported within said case about said pinion cross shaft, each of said pinion gears meshingly engaging each of said side gears;
   a retainer block provided with a slot for receiving said central portion of said pinion cross shaft, said slot defining an inner surface engageable with said central portion and having a configuration which cooperates with said central portion to limit axial movement of said pinion cross shaft along pinion axis relative to said retainer block;
   means for securing said retainer block relative to said differential case.

8. The differential assembly according to claim 7 wherein said central portion of said pinion cross shaft is provided with a pair of opposed flat surfaces parallel to said pinion axis and spaced apart by a predetermined distance, and said retainer block is provided with a slot for receiving said central portion, said slot defining a pair of generally parallel surfaces in facing relation to one another and spaced apart by approximately said predetermined distance, thereby limiting rotational movement of said pinion cross shaft about said pinion axis relative to said retainer block.

9. The differential assembly according to claim 8 wherein at least one of said opposed flat surface extends axially along said pinion cross shaft a predetermined length, and wherein said slot in said retainer block extends approximately said predetermined length, thereby limiting the axial movement of said pinion cross shaft along said pinion axis relative to said retainer block.

10. The differential assembly according to claim 7 wherein said retainer block includes at least one end portion which is received within an opening formed in at least one of said side gears to secure said retainer block relative to said differential case.

* * * * *